United States Patent [19]

Bassett

[11] 4,181,057

[45] Jan. 1, 1980

[54] PORTABLE RADIAL SAW

[76] Inventor: Alvin L. Bassett, 2148 SE. 135th St., Portland, Oreg. 97233

[21] Appl. No.: 897,738

[22] Filed: Apr. 19, 1978

[51] Int. Cl.² ............................................. B27B 5/20
[52] U.S. Cl. ................................. 83/486.1; 83/471.3; 83/522
[58] Field of Search ...................... 83/471.3, 486.1, 522

[56] References Cited

U.S. PATENT DOCUMENTS

| 2,589,554 | 3/1952 | Killian | 83/486.1 |
| 2,770,265 | 11/1956 | Pollock | 83/522 |
| 2,803,271 | 8/1957 | Shaw | 83/522 |
| 2,818,892 | 1/1958 | Price | 83/471.3 |

Primary Examiner—Donald R. Schran

Attorney, Agent, or Firm—John A. Hamilton

[57] ABSTRACT

A portable radial saw consisting of a planar work table, an arm extending horizontally over the table, being pivoted on a vertical axis to the table adjacent one edge of the table and guided for movement concentric to its pivotal axis adjacent the opposite edge of the table, being connected to the table by vertically yieldable connectors whereby to rest by gravity on work pieces supported on the table, a carriage movable along the arm and adapted to carry a power saw operable to saw a work piece on the table as the carriage traverses the table, clamps operable to secure both ends of the arm solidly against pivotal movement, and a gauge operable to preset the depth of the saw cut despite the variable elevation of the arm above the table.

4 Claims, 31 Drawing Figures

PORTABLE RADIAL SAW

This invention relates to new and useful improvements in saws generally of the "table" type, in that the work piece to be sawed is placed on a work table and cut by a power saw carried and guided by elements mounted on the table for controlled and operable movement relative to the work piece.

One object of the present invention is the provision of a saw of the general character described which utilizes an ordinary, normally hand-held circular power saw as the actual cutting element of the total assembly. Since the advent of the popularity of power saws of this type, it has become apparent to users that the provision of mechanical means for guiding the saw through the work would be highly advantageous, since the power saw itself must be guided manually, and consequently renders any great accuracy in its use difficult or practically impossible. The present device is capable of using such a hand-held power saw releasably mounted therein, with only minor changes which in no way affect or decrease its utility in its basic usage.

Another object is the provision of a saw of the type described including an arm extending horizontally over a work supporting table, said arm being carried for pivotal movement on a vertical axis adjacent one edge of the table, and guided adjacent the opposite edge of the table for movement concentric to its pivotal axis, the power saw unit being mountable in a carriage movable along said arm, and operable to cut below the level of the arm. An advantage of securing the arm to the table at both ends, as compared to the usual radial arm saw in which the arm is of a cantilever type supported at only one end, is that it eliminates any need for the extremely strong construction, usually involving heavy cast parts, commonly used in radial arm saws, while still supporting the arm rigidly for accurate, vibration-free saw cuts. Positive clamps may also be provided to hold the arm solidly against vibration, thereby providing still greater accuracy.

Another object is the provision of a saw of the character described wherein the arm is connected to the table by vertically yieldable connectors, so that said arm rests by gravity on the work piece supported by the table. The weight of the arm stabilizes the work piece relative to the table, and also stabilizes the arm relative to the work, eliminating other possibilities of vibration and inaccurate cuts. Means are provided for elevating the arm to permit the insertion of a work piece thereabout, and for insuring that the arm itself remains accurately horizontal at all elevations thereof above the table, said elevation of course varying with the thickness of the work piece.

Another object is the provision, in a saw of the character shown, of means for accurately presetting the depth of a saw cut to be made in the work piece, which functions despite and independently of the variability of the elevation of the saw-carrying arm above the table supporting the work piece. A safety means is also provided requiring the gauge element to which the saw blade is touched in the setting operation to be moved well out of range of the blade before said blade can be actuated.

Another object is the provision of a saw of the character described having an indicating device which accurately indicates the line of a saw cut to be made in a work piece while the saw itself is still remote from the work piece. This eliminates much of the careful "cut and try" adjustment of the work piece on the table which has heretofore been necessary and common to insure the proper point of saw entry into the work piece.

Another object is the provision of a saw of the type described which is truly portable, in order that it may conveniently be carried to and used on a job site, as for example by a carpenter at a construction site. Provisions contributing to this portability are a construction permitting the use of light weight materials, such as sheet metal instead of heavy cast metal parts, and which permits easy and rapid disassembly without tools, of the total assembly into a plurality of sub-assemblies each of which may easily be carried.

With these objects in view, as well as other objects which will appear in the course of the specification, reference will be had to the accompanying drawing, wherein.

Figures 22, 23, 24, 25, 26:
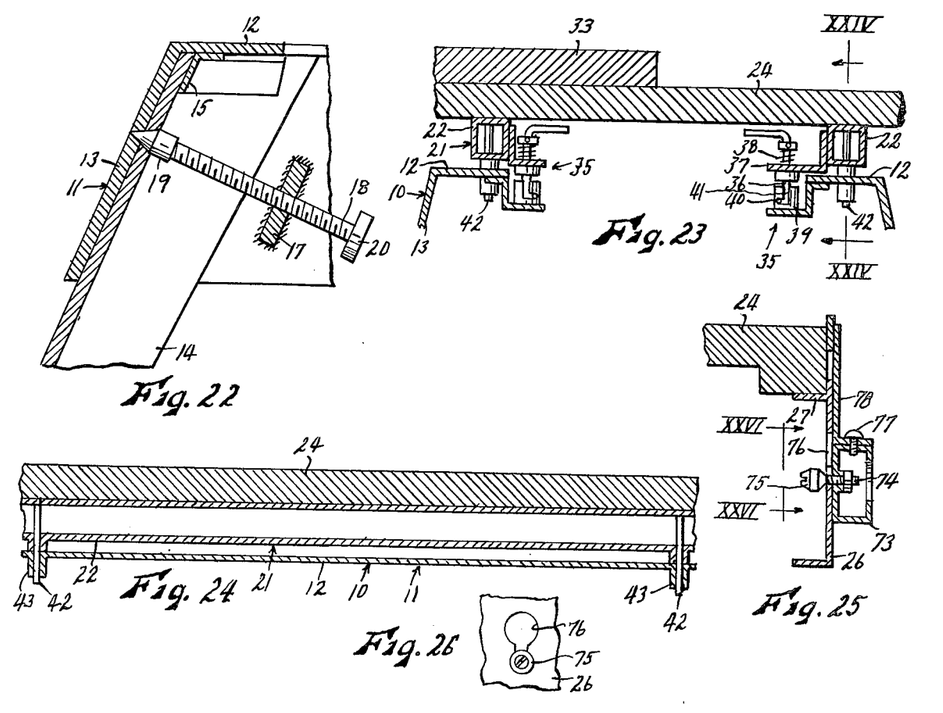
FIG. 22 is an enlarged, fragmentary sectional view of the saw table stand only, taken on line XXII—XXII of FIG. 1.
FIG. 23 is an enlarged, fragmentary sectional view taken on line XXIII—XXIII of FIG. 1.
FIG. 24 is a fragmentary sectional view taken on line XXIV—XXIV of FIG. 23.
FIG. 25 is an enlarged, fragmentary sectional view taken on line XXV—XXV of FIG. 1.
FIG. 26 is a fragmentary view as indicated by line XXVI—XXVI in FIG. 25.

Like reference numerals apply to similar parts throughout the several views, and the numeral 10 refers generally to the support stand of the saw. It consists of a rectangular top frame 11 formed of angle-irons each having a horizontal top leg 12 (FIGS. 2, 22 and 23) and an outwardly and downwardly inclined leg 13, and an outwardly and downwardly extending floor-engaging leg 14 fixed in each corner thereof. Each leg is also formed of angle iron, its upper end engaging slidably in a bracket 15 fixed under top leg 12 of the frame, and the lower edge of leg 13 of the frame engaging slidably in a bracket 16 fixed to the outer surface of the leg. As best shown in FIG. 22, an angled bar 17 fixed across each internal corner of frame 11 has a screw 18 threaded therein, said screw being provided at one end with a swivel head 19 engageable in matching holes formed therefor in the leg and frame leg 13, and at its other end with a hand operating knob 20. By loosening screws 18, which may be done by hand, the legs 14 may thus be disassembled from frame 11.

Figures 15, 16, 17, 18, 19, 20:
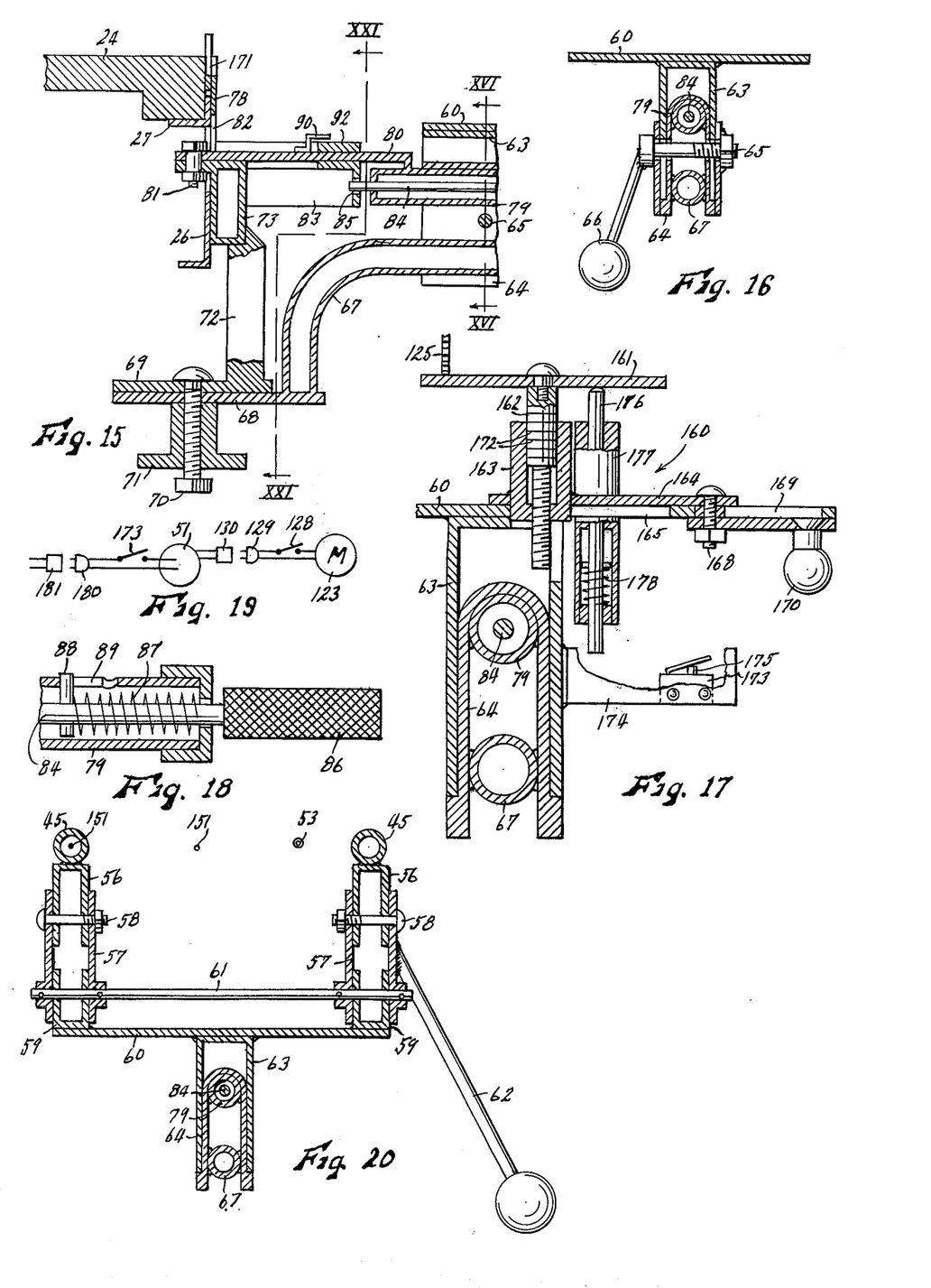
FIG. 15 is a fragmentary sectional view taken on line XV—XV of FIG. 14.
FIG. 16 is a sectional view taken on line XVI—XVI of FIG. 15.
FIG. 17 is an enlarged sectional view taken on line XVII—XVII of FIG. 14.
FIG. 18 is an enlarged, fragmentary sectional view taken on line XVIII—XVIII of FIG. 14.
FIG. 19 is a schematic wiring diagram of the saw.
FIG. 20 is an enlarged sectional view taken on line XX—XX of FIG. 1.
Figure 30:
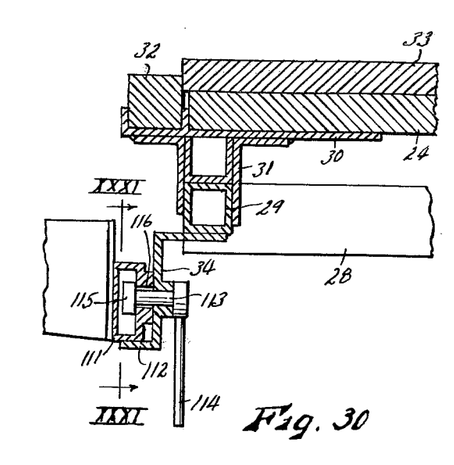
FIG. 30 is a fragmentary sectional view taken on line XXX—XXX of FIG. 27.

Supported on frame 11 is a table rack 21 consisting of a pair of parallel, spaced apart bars 22 of greater length than the width of frame 11, and an upstanding C-bar 23 extending transversely to bars 22 at each end thereof, and rigidly affixed to said bars. Bars 22 support a work table 24, which constitutes a slab of wood, fiber, or other material capable of being cut by a saw, with C-bars 23 contacting and confining the side edges of said work table. A horizontal arm 25 projects forwardly from each forward corner of frame 11, being affixed to said frame, and a transversely extending, vertically disposed mounting plate 26 is affixed to the forward ends of said arms. As shown in FIGS. 15 and 25, plate 26 extends upwardly to overlie and confine the forward edge of table slab 24, and it is provided with a horizontal ledge 27 for supporting said table slab. A horizontal arm 28 is affixed to and extends rearwardly from each rearward corner of frame 11, and a transversely extending horizontal square bar 29 is affixed between the rearward ends of said arms. As best shown in FIG. 30, a transversely extending horizontal plate 30 is provided for supporting the rearward edge portion of table slab 24, and said plate has affixed thereto a depending bracket 31 of inverted U-shape which engages releasably over square bar 29. Plate 30 also provides a groove for supporting a bar 32, also of wood or the like, extending along the rearward edge of table slab 24, and rising above the level of said slab to form a fence for assisting in the positioning of a work piece 33 on said slab. Square mounting bar 29 also has affixed thereto a depending mounting plate 34 which serves as a mounting for an arcuate guide to be described hereinbelow.

Table rack 21 is detachably mounted on frame 11 by a pair of latches 35 best shown in FIG. 23. As there shown one of said latches is associated with each bar 22 of the rack, which overlie the top legs 12 of the front and rear members of frame 11. Each latch consists of a vertical rod 36 carried for vertical sliding movement in a keeper 37 affixed to the associated bar 22, said rod being biased upwardly by a spring 38, but being manually depressible to engage in a tubular keeper 39 affixed to frame leg 12. Said rod is provided with a transverse pin 40 which then enters the vertical leg of an L-shaped slot 41 of keeper 39, and engages in the base leg of said slot when the rod is turned, thus locking the rack in assembly with frame 11. Each bar 22 may also have two or more pins 42 affixed therein (see FIG. 26), in spaced apart relation, which engage downwardly in sockets 43 formed therefor in frame leg 12, as a further aid in accurately positioning said rack.

The structure thus far described may conjointly be defined as the "table assembly" of the total structure, but as has been described, even this sub-assembly consists of several components, such as stand frame 11 with its mounting members 26, 29 and 34, rack 21, plate 30 and table slab 24 may be easily disassembled, without the use of tools, for easy portability.

Figures 11, 12, 13:
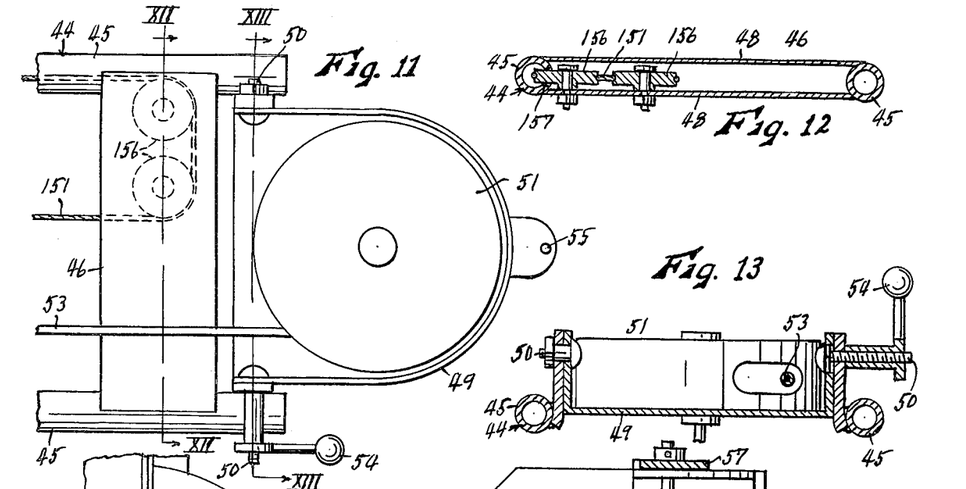
FIG. 11 is an enlarged, fragmentary top plan view of the forward end portion of the radial arm of the saw, as indicated by line XI—XI of FIG. 1.
FIG. 12 is a sectional view taken on line XII—XII of FIG. 11.
FIG. 13 is a sectional view taken on line XIII—XIII of FIG. 11.

A saw-carrying arm designated generally by the numeral 44 extends over table slab 24 from front to rear. It consists of a pair of parallel, spaced apart rails 45, which may be formed of tubular stock, and which are rigidly joined by front and rear cross heads 46 and 47 respectively adjacent their forward and rearward ends. As shown for example in FIG. 12, each of said cross heads may consist of a pair of vertically spaced apart plates 48 extending transversely between and rigidly affixed at their ends to rails 45, and disposed entirely above a plane established by the lower edges of said rails.

At the forward end of arm 44, a planar reel holder 49 is pivoted thereto as by bolts 50, which extend horizontally and transversely of the arm. Said holder has mounted thereon a spring-loaded cable reel 51, well understood in the art, to which an electric cable 52 is directed upwardly through holder 49 and from which an electric cable 53 normally extends rearwardly over arm 44, the reel being spring biased to wind cable 53 forwardly into said reel. Holder 49 normally extends horizontally forwardly from arm 44, being held in this position by one of bolts 50, which acts as a compression clamp releasable by a handle 54. When this clamp is released, holder 49 may be pivoted upwardly and forwardly to overlie the forward end portion of arm 44. In this position, a normally vertical latch pin 55 mounted at the forward end of holder 49 cooperates with the saw carriage in a manner to be described.

Figure 21:
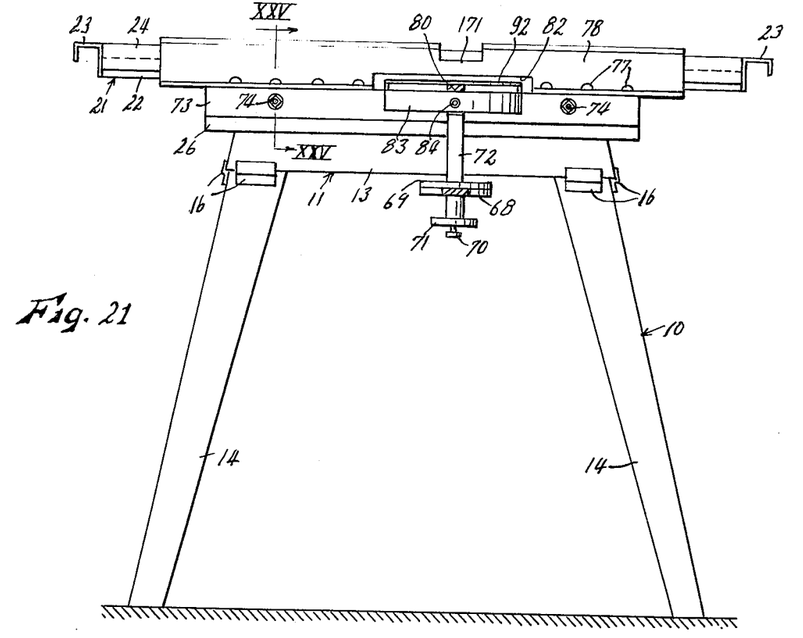
FIG. 21 is a reduced sectional view taken on line XXI—XXI of FIG. 15, and extending the full height of the saw table.

Forwardly of the table, but rearwardly of the forward end of arm 44, a bracket 56 (see FIG. 20) is affixed to the bottom side of each arm rail 45. A double link 57 is pivoted at its upper end, as at 58, to each of brackets 56, and at its lower end to a bracket 59 affixed to a horizontal support plate 60, by means of a horizontal transverse shaft 61 which is affixed to each of links 57 but pivotal in brackets 59. Thus links 57 may be pivoted simultaneously, to raise or lower arm 44 relative to plate 60, by a single handle 62 affixed to one of links 57. Plate 60 has a bracket 63 of inverted U-shape (see FIGS. 17 and 20) affixed to the lower surface thereof, said bracket being engageable downwardly over a similarly shaped bracket 64 and releasably secured thereto by a clamp bolt 65 operable by a handle 66 (see FIG. 16). Bracket 64 is rigidly attached by a rearwardly and downwardly curved arm 67 (see FIG. 15) which is in turn affixed at its lower end to a clamp disc 68 lying in a horizontal plane. Disc 68 is connected pivotally to a frictionally contacting clamp disc 69 by a vertical clamp bolt 70 which may be operated to permit or restrict relative pivotal movement of the discs by a hand-operated nut 71 threaded thereon. Disc 69 has affixed thereto an upstanding post 72, which is affixed at its upper end to a horizontal, transversely extending beam 73 which overlies the front surface of front mounting plate 26, and is detachably connected thereto by a pair of spaced apart bolts 74 affixed in the beam (FIGS. 21 and 25). Each bolt has an enlarged head 75 insertable rearwardly through an enlarged upper portion of a keyhole slot 76 formed in plate 26, and is secured in said slot by lowering it into the narrower lower portion of said slot. Also affixed to beam 73, as by screws 77, is the lower edge of a vertically disposed, transversely extending plate 78, which overlies the forward edge of table slab 24 and projects slightly above the top surface of said slab to form a front fence aiding in positioning work pieces accurately on the table.

Also affixed in bracket 64, above arm 67, is a horizontal tube 79, which terminates at its forward end short of the table assembly, but has affixed thereto an arm 80, which extends forwardly from the tube slightly above the level thereof, and is pivoted at its forward end to beam 73 by means of a vertical pivot bolt 81 coaxial with bolt 70, and is accomodated in a notch 82 cut in fence plate 78. The forward end of tube 79 moves in close proximity to an arcuate latch plate 83 (see FIG. 15) affixed to beam 73 concentrically with bolt 81, and said tube has a latch pin 84 extending longitudinally therethrough and projecting from the rearward end thereof to engage in a hole 85 formed therefor in latch plate 83. The latch pin 84 also projects from the forward end of tube 79 (see FIG. 18) and has a handle 86 affixed thereto by which the pin may be retracted against a spring 87 within tube 79 to withdraw it from hole 85 of the latch plate, a transverse pin 88 fixed in pin 84 cooperating with an L-shaped slot 89 of tube 79 to hold the latch pin in a retracted position whenever desired (see also FIG. 14). Thus the arm 44 may be pivoted horizontally about the vertical axis of bolts 70 and 81, it being understood that latch plate 83 may be provided with holes 85 at the arm angles most commonly used, and clamped securely against vibration, either at the positions indexed by the latch pin, or at any intermediate position, by tightening nut 71. An index pointer 90 affixed to arm 80 cooperates with indicia 91 imprinted on an arcuate index plate 92 overlying arm 80 and latch plate 83, and affixed to beam 73, to indicate accurately the angle of arm 44. The forward end of arm 44 may be easily detached from bracket 64 by loosening bolt 65, and the assembly including bracket 64, arm 67, tube 79 and arm 80, friction discs 68 and 69, beam 73 and fence plate 78 may be easily detached from the table assembly by lifting bolts 74 of beam 73 out of engagement with slots 76 of plate 26.

Figures 27, 28, 29:
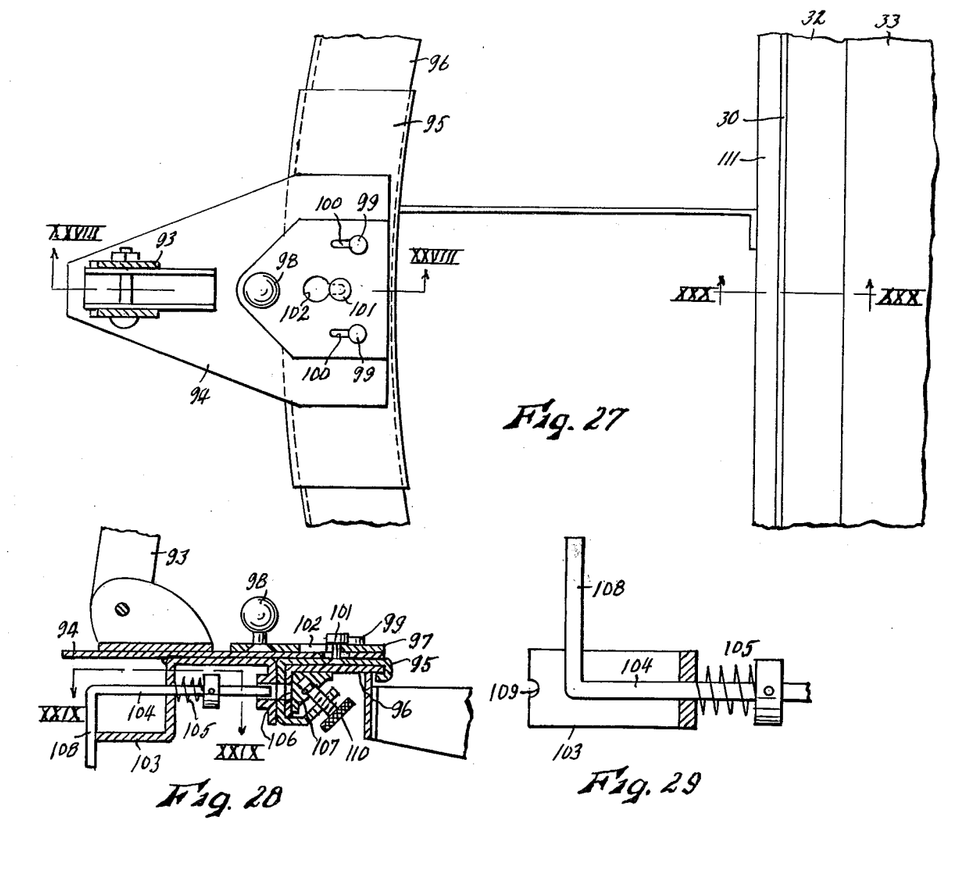
FIG. 27 is an enlarged, fragmentary sectional view taken on line XXVII—XXVII of FIG. 2.
FIG. 28 is a fragmentary sectional view taken on line XXVIII—XXVIII of FIG. 27.
FIG. 29 is an enlarged fragmentary sectional view taken on line XXIX—XXIX of FIG. 28, showing the indexing latch engaged.

The rear crosshead 47 of arm 44 is connected by a double pivoted link 93, parallel at all times to front links 57, to a horizontal mounting plate 94 disposed below said arm. Said mounting plate projects forwardly, and overlies the planar top surface of a carriage 95 (FIGS. 27-28) which is mounted for sliding movement along a horizontally arcuate track 96 which is concentric with front pivot bolts 70 and 81. Plate 94 is releasably secured to carriage 95 by a movable slide 97 overlying plate 94, being movable by a handle 98 and guided by rivets 99 fixed in plate 94 and engaged in parallel slots 100 formed in the slide. A headed rivet 101 fixed in carriage 95 projects upwardly through a hole formed in plate 94, and through a keyhole slot 102 formed in slide 97. Only when the slide is moved to align the larger end of slot 102 with rivet 101 can the plate 94 be detached from carriage 95.

Mounted on the lower surface of plate 94 is a bracket 103 (see FIGS. 28-29) which carries a latch pin 104 which extends radially of track 96, and which is biased by spring 105 to engage in a hole 106 formed therefor in the track, whereby to secure the carriage against movement along the track. Here again, the track may be provided with any desired number of holes 106 to index the carriage at different angular positions on the track. Latch pin 104 may be secured in its released position by retracting it against spring 105, and turning it to engage an angled handle portion 108 thereof in a notch 109 of bracket 103. The track is formed of angle-iron stock, and the carriage may be clamped at any position thereon by a friction clamp shoe 107 engaging the internal angle thereof, and operable by a hand-turned screw 110 threaded in an arm of carriage 95.

Figure 31:
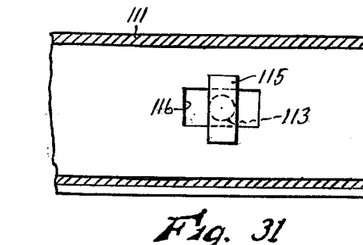
FIG. 31 is an enlarged, fragmentary sectional view taken on line XXXI—XXXI of FIG. 30.

Track 96 is supported by a horizontal transverse beam 111 affixed at its ends to the end portions of said track, and in turn supported by resting it on a ledge 112 formed by a bending the lower edge of rear mounting plate 34 of the table assembly to the rear (FIGS. 30-31). It is secured to mounting plate 34 by a T-headed shaft 113. Said shaft is rotatable in said mounting plate by a handle 114, and has at its rearward end a T-head 115 insertable into beam 111 through a rectangular slot 116 of said beam. Only when the shaft is turned by handle 114 to align its T-head 115 with slot 116 can the beam be detached from mounting plate 34. Thus the rearward end of arm 44 can be detached from track carriage 95 by operation of slide 97, and the track assembly can be detached from the table assembly by turning shaft 113, all without the use of tools.

Arm 44 supports a saw cradle designated generally by the numeral 117 for sliding movement therealong. Said saw cradle comprises a horizontal bed plate 118 extending between the side rails 45 of said arm, said bed plate being substantially planar, flush with the lower edges of said side rails and having upturned lips around its edges, and an arcuate hook 119 fixed to each corner of said bed plate and partially encircling the associated rail 45 in sliding relation thereto. Neither the bed plate nor the hooks project below the lower plane of rails 45, since as will appear the side rails rest on work piece 33 in the use of the device, and saw cradle 117 must pass over said work piece.

Cradle 117 is adapted to support thereon a normally handheld power saw unit of generally regular form, and designated generally by the numeral 120. As shown in FIGS. 2-7, said saw unit includes a planar base plate 121, a saw housing 122 disposed above the base plate and carrying an electric motor 123, and including a handle 124, a circular saw blade 125 rotatably driven by motor 123, either directly or by a step-up gear train carried in the housing, and a downwardly opening blade guard 126 protecting said blade. Said blade guard may be extra wide, to accomodate wide dadoing blades or the like if desired. An electric cable 127 supplies power to motor 123, under the control of a trigger-type electric switch 128 (FIGS. 2 and 19) mounted in handle 124, and is provided with a male plug 129, adapted to be plugged into a female receptacle 130 mounted in any suitable manner at the forward end of cradle 117. Saw housing 122 is pivoted, as at 131, to a bracket 132, on an axis parallel to but horizontally spaced apart from the blade axis. Bracket 132 is fixed to the free end of an arm 133 which extends horizontally toward the plane of the blade, and is pivoted at its opposite end, as at 134, to an upturned lip 135 of base plate 121, on an axis disposed generally just below blade 125 and parallel to the plane of the blade. Arm 133 is connected by a winged clamp bolt 136 to a slotted arcuate segment 137 of lip 135, whereby by loosening said wing bolt, the saw housing may be pivoted about pivot 134 relative to base plate 121, in a plane normal to the plane of the blade. Saw housing 122 may also be adjustably pivoted about pivot 131, in a plane parallel to the plane of the blade, whereby the blade may be extended downwardly to project through a notch 138 formed in the edge of base plate 121 lying generally below blade 125, to cut work pieces over which base plate 121 is moved. For this purpose, a slotted arcuate guide 139, concentric with pivot 131 and lying in a plane parallel to the blade, is pivoted at its lower end, as at 140 (FIG. 3), to an upturned tab 141 of base plate 121, on an axis coaxial with pivot 134. Guide 139 projects upwardly into blade guard 126, adjacent the blade, and housing 122 carries a clamp bolt 142 slidably engaged in the arcuate slot of said guide and tightened by a manually operable nut 143 (see FIG. 7). Thus, by loosening wing bolt 136, blade 125 may be tilted laterally of its plane, and by loosening bolt 142, it may be tilted at pivot 131 to project variable distances below base plate 121.

Figure 1:
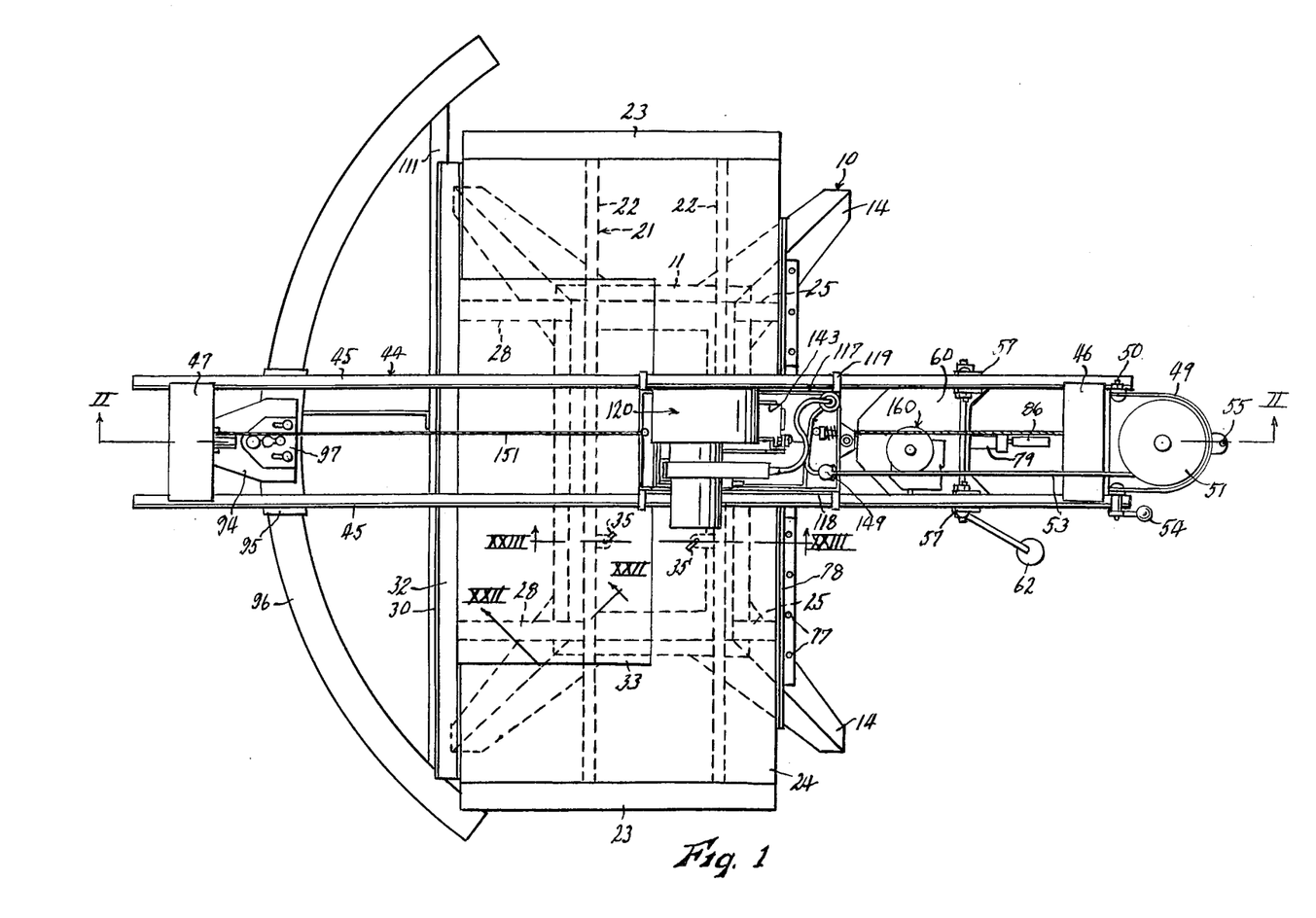
FIG. 1 is a top plan view of a portable radial saw embodying the present invention, with parts omitted.
Figures 2, 5, 6:
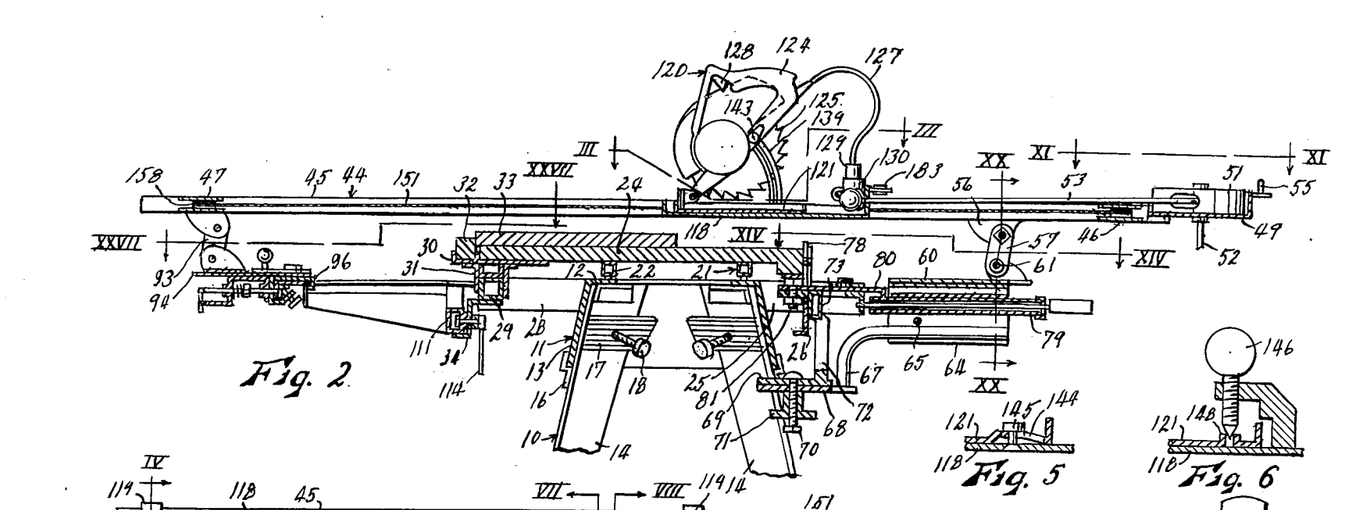
FIG. 2 is a slightly irregular fragmentary sectional view, with parts again omitted, taken generally on line II—II of FIG. 1.
FIG. 5 is a fragmentary sectional view taken on line V—V of FIG. 3.
FIG. 6 is a fragmentary sectional view taken on line VI—VI of FIG. 4.
Figure 3:
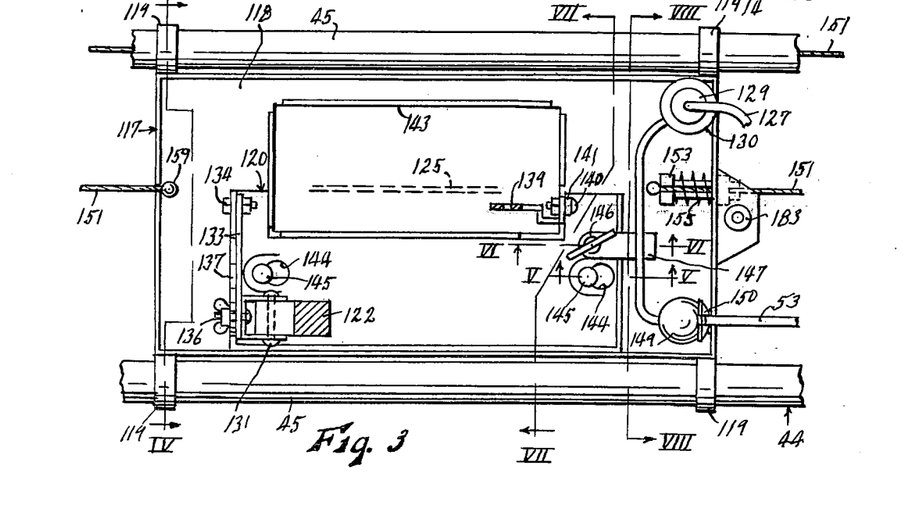
FIG. 3 is an enlarged fragmentary sectional view taken on line III—III of FIG. 2.
Figure 4:
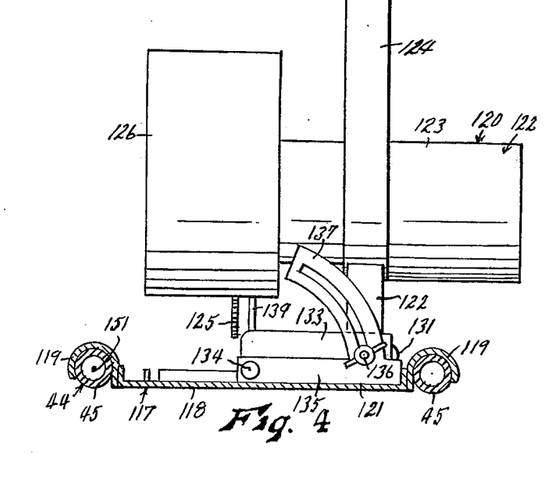
FIG. 4 is a sectional view taken on line IV—IV of FIG. 3.
Figure 7:
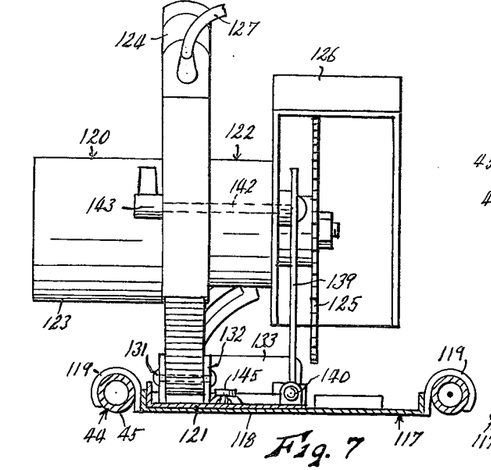
FIG. 7 is a sectional view taken on line VII—VII of FIG. 3.

In the present device, the power saw unit 120 is mounted in cradle 117, for easy detachment therefrom, by affixing its base plate 121 flat on the upper surface of bed plate 118 of the cradle, in a position in which notch 138 of the base plate coincides in part with a rectangular hole 143 (FIGS. 1 and 3) formed in said bed plate, whereby saw blade 125, the plane of which is indicated in dotted lines in FIG. 3, may be adjusted to project below said bed plate to cut work pieces disposed therebelow. For this mounting of the power saw, base place 121 is provided with a pair of keyhole slots 144, the larger end of which is sized to engage over the head of a headed pin 145 fixed in bed plate 118, the base and bed plates being locked in engagement by sliding the former over the latter until pins 145 are engaged in the narrower ends of slots 144. In this position, a vertical set screw 146 threaded in a bracket 147 affixed to the bed plate may be threaded downwardly to engage in a socket member 148 of the base plate to secure the plates against relative sliding movement. As shown in FIG. 5 the surface of plate 121 surrounding each slot 144 is inclined upwardly toward the narrower end of the slot, whereby to provide a tight downward clamping of plate 121 against plate 118 when said plates are assembled. Modification of the base plate 121 of most common power saws requires only the formation of slots 144 and socket 148 therein. These alterations in no way impair the use of the power saw as a hand-held unit, and it may easily be removed from cradle 117 when such use is desired.

Figure 8:
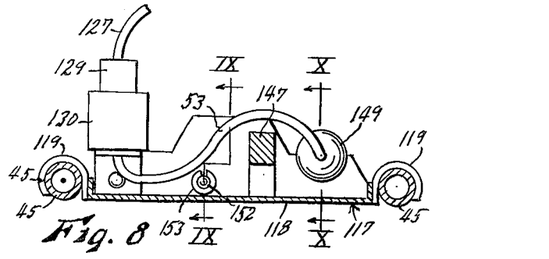
FIG. 8 is a sectional view taken on line VIII—VIII of FIG. 3.

Electric cable 53 from spring reel 51 extends forwardly along arm 44, has a ball 149 affixed thereon (FIGS. 3 and 8) which is engaged releasably in a keeper 150 affixed to a forward lip of bed plate 118 to absorb the spring tension of the reel and keep the cable taut, and then extends to the female electric receptacle 130 mounted on said bed plate.

A cut marking line, consisting of a thin steel cable 151 is secured by a ball 152 affixed to its end (FIG. 9) in a plunger 153 which is slidable forwardly and rearwardly in a bushing 154 of the front lip of the bed plate 118, and biased rearwardly by spring 155. Said cable extends forwardly parallel with arm 44, enters between the top and bottom plates 48 of front cross head 46 of the arm, is trained about a pair of pulleys 156 rotatably mounted between said plates, the second of which enters the right hand arm rail 45 through a slot 157 of said rail, then extends rearwardly through said rail to rear cross head 47, around a pair of pulleys 158 similarly mounted in said rear cross head (FIG. 2), then forwardly to cradle 117, where it is secured in a rear lip of bed plate 118 by a ball 159 (FIG. 3). Said cable, rearwardly of the saw cradle, is disposed accurately in the vertical plane of saw blade 125, and lies against or closely adjacent the top surface of work piece 33, being maintained taut at all times by its tensioning spring 155. Thus it accurately indicates the line of a saw cut to be made in the work piece, even when the saw itself is remote from the work piece.

Figure 14:
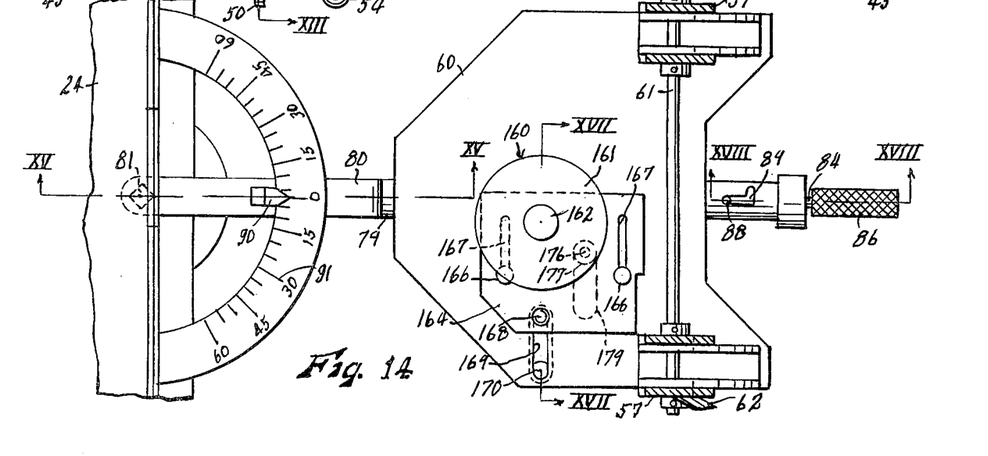
FIG. 14 is an enlarged, fragmentary sectional view taken on line XIV—XIV of FIG. 2.

Loosening of clamp bolt 142, as previously described, permits saw housing 122 to be pivoted at 131 to project saw blade 125 below bed plate 118, the depth of the saw cut to be formed being determined by the degree of this projection, which may be accurately preset by means of a gauge device designated generally by the numeral 160 and best shown in FIGS. 14 and 17. It is carried on mounting plate 60 of the front mounting of arm 44, and includes a horizontal circular gauge disc 161 fixed on a vertical stem 162 which is rotatably and threadably mounted in a vertical sleeve 163 fixed in a slide plate 164 movable on the top surface of plate 60, extending both above and below plate 164, with its downwardly extending portion being slidably engaged in a slot 165 of plate 60 extending transversely to arm 44. Plate 164 is also guided for movement in this transverse direction by a pair of headed rivets 166 (FIG. 14) fixed in plate 60 and engaged in slots 167 of plate 164. Also fixed in plate 164 is a bolt 168, movable in a transverse slot 169 of plate 60, which connects said plate to a handle 170 disposed beneath plate 60. When slide 164 is moved to the left by handle 170, as viewed and shown in FIG. 17, gauge disc 161 is positioned to extend beneath the vertical plane of saw blade 125, as indicated, but when the slide is moved to the right, the disc is withdrawn from below the saw. It will be noted that arm 44 is of sufficient length, forwardly of the table, to permit saw cradle 117 to be moved forwardly to align the saw blade over disc 161. It will be seen in FIG. 21 that front fence plate 78 is provided with a notch 171 to permit passage of the saw blade therethrough. The saw blade may then be adjusted vertically, by loosening clamp bolt 142, until its lowermost point just contacts disc 161. Said disc is preferably formed of fiber or the like, which can be cut by and which will not damage the blade. The stem 162 of the disc has longitudinally spaced indicia 172 imprinted thereon, which may be indexed to the top end of sleeve 163 to preset the elevation of disc 161 to a known scale. For example, as set in FIG. 17, the top surface of disc 161 may be precisely at the same elevation as the top surface of the table slab, so that the saw blade, when indexed thereto, will cut entirely through a work piece on the table slab, but not into the slab. Disc 161 is often set slightly lower than the table surface, so that the saw blade, when indexed thereto, will not only cut entirely through the work piece, but also slightly into the table slab. This provides a cleaner cut at the lower surface of the work piece, and the table slab is of course formed of a material which may be cut by the saw, as in rear fence member 32. Disc 161 may also be set above the level of the table, in measured increments indicated by indicia 172, whereby the saw blade, when indexed thereto, will not cut entirely through the work piece, but only cut a groove therein. This setting is used in cutting dado grooves in boards, as often used in cabinet work and the like.

The withdrawal of gauge disc 161 to the right, as viewed in FIG. 17, out of the plane of the saw blade, of course tends to prevent damage to the blade by the disc, or vice versa. However, to further obviate any damage in the event they should contact while the blade is turning, there is provided a micro-switch 173 mounted on a bracket 174 affixed to bracket 63 below mounting plate 60. Said switch is normally open, but closed by depression of its operating button 175. It is operated by a vertical plunger 176 carried for vertical sliding movement in a vertical sleeve 177 fixed in slide plate 164 beneath disc 161, and is biased upwardly by a spring 178 to press against the lower surface of disc 161 at all times. Sleeve 177 is fixed in slide plate 164 and move in a transverse slot 179 when said slide plate is moved. Plunger 176 extends below sleeve 177, and is positioned to engage and close switch 173 only when slide plate 164 is both moved to the right, as viewed in FIG. 17, to withdraw disc 161 from the plane of saw blade 125, and also only when disc stem 162 is threaded downwardly in sleeve 163 to lower disc 161 below the lowermost possible setting of the blade. The relationship of switch 173 to the circuit of saw motor 123 is shown in FIG. 19. The electric supply cable of said motor is provided with a male plug 180 engageable in any suitable female outlet 181, then proceeds to safety switch 173, then to spring reel 51, then to female outlet 130 of saw cradle 117, male plug 129, trigger switch 128 of the saw housing, and finally to motor 123. Thus the motor cannot operate, and the saw blade cannot turn, unless switch 173 is closed, and said switch cannot be closed unless gauge disc 161 is out of the path of saw blade 125, and also lowered so that it cannot be moved into the path of the blade by operation of slide 164.

Operation of the device is believed to be reasonably apparent from the foregoing description of its construction. In a typical usage thereof, arm 44 is first elevated by manual operation of handle 62, which turns shaft 61 and operates front links 57 to elevate said arm, with rear link 93 duplicating the motion of front links 57 to elevate the rearward end of the arm. The upper and lower pivots of the front and rear links define a parallelogram having its major legs parallel to the surface of table slab 24, so that said arm is maintained parallel to the table surface at all elevations of the former. Suitable stops, not shown, may be provided, if desired, to limit the raising motion of said links to a position slightly past vertical, as shown in FIG. 2, whereby the arm, once elevated, will remain elevated until intentionally lowered. A board or other work piece 33 is then inserted between the arm and table slab 24, to rest on the table, and is aligned at a known angularity to arm 44 by pressing an edge thereof against either rear fence member 32 or front fence plate 78. Clamp nut 71 of front friction discs 68 and 69, and operating screw 110 of rear clamp shoe 107 may then be loosened, and arm 44 pivoted freely on the vertical axis provided by bolts 70 and 81 to set the arm at the desired angle of cut relative to work piece 33, since the rearward end of the arm is then supported by carriage 95 which is freely movable along arcuate track 96 which is concentric with the pivotal axis of the arm.

The arm 44 may then be lowered, again by operation of handle 62, until the side rails 45 of said arm rest directly on the work piece 33. At this time, cable 151 will rest on or very closely adjacent the surface of the work piece, and will indicate accurately thereon the line along which a saw cut will be made when the saw is advanced along the arm, even when the saw itself is disposed remotely from the work piece. This largely eliminates the usual necessity of advancing the saw along the arm until the blade touches the work, in order to determine the point of entry of said blade into the work, and thus simplifies the accurate placement of the work on the table.

Saw cradle 117 is then moved forwardly along the arm until the saw blade is disposed generally over gauge disc 161, said disc is moved by operation of handle 170 to be disposed beneath the saw blade, thereby opening safety switch 173, and the disc turned manually to elevate the top surface thereof to a plane, relative to the surface of table slab 24, representing the depth of the saw cut desired, as previously described. Clamp bolt 142 is then loosened, and saw housing 122 pivoted downwardly on pivot 131 until the saw blade touches disc 161, after which clamp bolt 142 is again tightened. Disc 161 is then moved out of the saw plane of the blade, and also screwed downwardly so that plunger 176 closes switch 173 to permit operation of saw motor 123.

Saw cradle 117 is then moved manually along arm 44, to the rear, by grasping handle 124 of saw housing 122, while holding trigger switch 128 of said handle closed to actuate saw motor 123. In some cases, it may be desirable to provide switch 128 with a locking device for securing it closed when desired. As the saw cradle is moved rearwardly, the saw blade enters and makes the desired cut in the work piece, if necessary forming shallow cuts also in the top table slab 24 and in rear fence member 32, as already mentioned. The cut may be at right angles to, or related at any selected acute angle to, the work positioning fence members, or, by loosening wing bolt 136 and pivoting saw housing 122 about the axis of bolts 134 and 140 relative to its base plate 121, miter or compound miter cuts may also be made.

One important feature of the present invention is that arm 44, which corresponds to the arm of an ordinary radial arm saw, is securely connected to the table assembly adjacent both ends thereof, rather than being of a cantilever type supported at only one end as in the usual radial arm saw. This imparts rigidity of support for the arm, as is necessary for accurate work, with no necessity for forming said arm of heavy, expensive and essentially non-portable cast metal, as is customarily necessary to provide the required rigidity in the usual radial arm saw. Also, while both of the end connectors of the arm are provided with the usual detent-type indexing pins (pin 84 at the forward connection and pin 104 at the rearward connection), for convenience of making angular settings of the arm, it is also provided with positive clamp positioning means at both connections (clamp discs 68 and 69 at the forward connection and friction shoe 107 at the rearward connection). These clamping means are quite important in that they further secure the arm against vibration, as is necessary for accurate work, to a degree not obtainable with detent-type indexing pins, which inherently require some clearance to enter their keepers.

The construction of arm 44, to consist of spaced apart parallel rails 45 rigidly interconnected at their ends, provides a light weight arm, taking advantage of the lack of any requirement for a heavy arm as provided by connections of said arm to the table assembly at both ends thereof, while still providing an arm of the maximum rigidity consistent with its light weight construction. This arm construction also permits saw cradle 117 to be supported between rails 45, deriving support from both, whereby to be movable therealong with maximum freedom from lateral or vertical vibration or other movement. Earlier radial arm saws, wherein the saw-carrying support is disposed to one side of an arm by some sort of cantilever support have been subject to inaccuracies of work due to movements of this type.

The vertical yieldability of the end supports of arm 44, as provided by front links 57 and rear link 93, allows said arm to rest directly on a work piece disposed on the table. This causes the weight of the arm, and the elements carried thereby, to stabilize the work piece relative to the table, preventing or inhibiting vertical vibration of the work piece relative to the table, the prevention of which might require a strong downward manual pressure on the work piece. It also stabilizes the arm itself relative to the work piece, inhibiting relative vibration therebetween to permit more accurate work. This arrangement also permits virtually full utilization of the maximum depth of cut of the power saw unit 120 carried by the arm, as measured by the maximum possible projection of saw blade 125 beneath base plate 121 of the saw unit. This is true since if the arm rails 45 rest directly on the work, and cradle bed plate 118 moves slidably over the work substantially in sliding contact therewith, then base plate 121 of the power saw is separated from the work only by the thickness of bed plate 118. With relation to the power saw itself, it may be of the ordinary hand-held type in wide usage, the only modifications to its base plate 121 necessary to accomodate it for use in the present device being quite simple, and in no way affecting its utility in its ordinary usage.

Figures 9, 10:
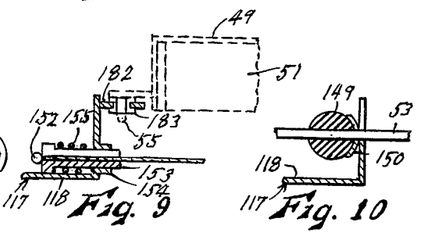
FIG. 9 is a fragmentary sectional view taken on line IX—IX of FIG. 8.
FIG. 10 is a fragmentary sectional view taken on line X—X of FIG. 8.

Another important feature are the provisions which render the device completely and easily portable, to the end that it may be transported to a temporary job site, and from one job site to another, rather than being confined by its weight and lack of easy portability to use in a central shop. For this purpose, it is formed principally of sheet metal, light tubular stock and the like, rather than heavy cast metal and the like. Also, as described, all of the major components may easily be separated into sub-assemblies, without the use of tools, to the point that even the heaviest component may be of sufficiently small weight to be carried easily by a single person. In this connection, it is to be noted that the forward lip of saw cradle bed plate 118 has affixed thereto a forwardly projecting tab 182 (FIGS. 3 and 9) in which is mounted a vertically opening eyelet 183. Preparatory to detaching the arm assembly from the table assembly, saw cradle 117 is moved to the forward end of the arm, and holder 49 of spring reel 51 is pivoted upwardly and rearwardly over the arm, whereupon pin 55 of said reel holder enters eyelet 183, as indicated in FIG. 9. This locks the saw cradle against movement along the arm, so that said arm may be transported freely when it is subsequently detached from the table assembly.

Guide line cable 151 and gauge device 160 are of course also important feature of the invention, and their operation has been fully described.

While I have shown and described a specific embodiment of my invention, it will be readily apparent that many minor changes of structure and operation could be made without departing from the spirit of the invention.

What I claim as new and desire to protect by Letters Patent is:

1. A portable radial saw comprising:
   a. a table assembly having a horizontally planar top slab,
   b. an arm extending forwardly and rearwardly across the top slab of said table assembly,
   c. front connecting means joining the forward portion of said arm to said table assembly for horizontal pivotal movement above a vertical axis,
   d. rear connecting means joining the rearward portion of said arm to said table assembly for horizontal arcuate movement concentric with said front pivotal axis,
   e. a saw cradle mounted slidably on said arm for movement therealong to traverse the top slab of said table assembly,
   f. a power saw mounted on said cradle and operable to cut a work piece positioned on said table slab beneath said arm as said cradle traverses said table slab,
   g. a depth-of-cut gauge device comprising a support member disposed beneath a portion of said arm forwardly spaced from said table slab, a horizontally planar gauge member disposed above said support member, said arm being of sufficient forward extent that the blade of said power saw may be disposed directly above said gauge member, and said blade may be lowered to touch said gauge member by means of said power saw adjustment, and means mounting said gauge member on said support member, whereby the vertical elevation of said gauge member relative to said support member may be adjustably varied.

2. A portable radial saw as recited in claim 1 wherein said mounting means of said gauge member comprises:
   a. a vertical stem to which said gauge member is affixed, and
   b. a vertical sleeve carried by said support member and in which said stem is threaded for vertical movement said stem having longitudinally spaced indicia imprinted thereon which may be indexed to an end of said sleeve.

3. A portable radial saw as recited in claim 2 wherein said mounting means of said gauge member additionally includes:
   a. a slide carried for sliding movement by said support member in a direction transverse to said arm, and
   b. manually operable means for moving said slide whereby said gauge member may be selectively extended beneath or withdrawn from beneath said saw blade.

4. A portable radial saw as recited in claim 3 with the addition of a normally open electric switch mounted on said support member and connected in the operating circuit of said power saw motor, said gauge member stem being operable to engage and close said switch only when said gauge member is withdrawn laterally from beneath said saw blade, and lowered beneath the maximum possible downward extension of said saw blade below said arm.

* * * * *